April 21, 1953

C. B. HARKER 2,635,512

MACHINE FOR MAKING FIBROUS BOXES

Filed Jan. 31, 1951

INVENTOR.
Charles B. Harker
By:-

April 21, 1953 C. B. HARKER 2,635,512
MACHINE FOR MAKING FIBROUS BOXES
Filed Jan. 31, 1951 12 Sheets-Sheet 3

April 21, 1953

C. B. HARKER 2,635,512

MACHINE FOR MAKING FIBROUS BOXES

Filed Jan. 31, 1951

INVENTOR.
Charles B. Harker

April 21, 1953          C. B. HARKER          2,635,512

MACHINE FOR MAKING FIBROUS BOXES

Filed Jan. 31, 1951          12 Sheets-Sheet 10

INVENTOR.
Charles B. Harker

April 21, 1953 C. B. HARKER 2,635,512
MACHINE FOR MAKING FIBROUS BOXES
Filed Jan. 31, 1951 12 Sheets-Sheet 11

INVENTOR.
Charles B. Harker
By:— Samuel W. Kipnis
Atty.

April 21, 1953          C. B. HARKER          2,635,512

MACHINE FOR MAKING FIBROUS BOXES

Filed Jan. 31, 1951          12 Sheets-Sheet 12

INVENTOR.
Charles B. Harker

Patented Apr. 21, 1953

2,635,512

UNITED STATES PATENT OFFICE 2,635,512

MACHINE FOR MAKING FIBROUS BOXES

Charles B. Harker, Milwaukee, Wis., assignor to Clybourn Machine Corporation, Chicago, Ill., a corporation of Illinois Application January 31, 1951, Serial No. 211,484

19 Claims. (Cl. 93—37)

This invention relates to a compartment box making machine and concerns itself primarily with mechanism for folding a die cut cardboard blank or the like to provide side walls and end walls secured in proper relation and intermediate partitions which form separate compartments and for truing the same to provide sharp right angled corners for necessary stability.

It is an object of this invention to provide a compartment box which is strong and durable in which fruit can be shipped with a single fruit in each compartment, thereby preventing damaging contact or abrasion between the same.

It is a further object of this invention to produce a machine for forming such boxes from a die cut blank without any metal fastening means and in a continuous manner.

With these and other objects in view, which will become apparent as the description proceeds, this invention comprises the novel structure and combination of parts hereinafter described and more particularly pointed out and defined in the appended claims.

In the accompanying drawing which illustrates a preferred form of this invention and in which similar reference numerals refer to similar features in the different views.

Figure 14:
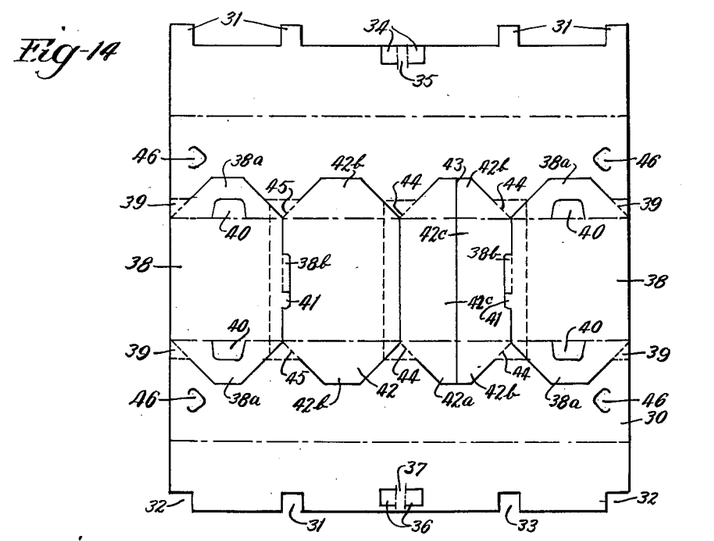
Fig. 14 is a plan view of a die cut blank ready for passage through the machine.

In referring now to the drawing, it appears desirable at the outset to describe the die cut blanks which are fed into the machine. One of these blanks is shown in Fig. 14 to which reference may now be had. This blank 30, which may be made of cardboard or any suitable fibrous material, is substantially square but may be of any suitable configuration depending upon the desired box. The blank is die cut to provide four tabs or locking lugs 31 at one edge which are suitably spaced as shown and with right angled cut-out corners or notches 32 at the opposite edge. Rectangular notches 33 are cut in the edge between the notches 32; the notches in such opposite edge being respectively in alignment with the tabs or lugs 31 upon the first mentioned edge, and they are of such dimensions as to receive the tabs.

Adjacent the tab edge of the blank, there are partially severed tabs 34 with a hinge portion 35 between the same. Directly opposite the tabs 34 adjacent the opposite edge of the blank are partially severed tabs 36 with a hinge portion 37 therebetween. These tabs 34 and 36 serve as locking or fastening means for the box as will later more fully appear.

The end walls and the partitions for the box are cut out from the central portion, with the exception of the hinge portions. The end walls are indicated at 38 and they are severed from the blank at all points except at the end edge points 39. The ends of the end wall portions are trapezoidal as indicated at 38a and at the inner line of each trapezoidal portion 38a, there is a partially severed tab 40 which can swing on the said inner line of the trapezoidal portion. The inner edge of each end wall 38 has an extension 38b which accrues from a cut-out portion 41 in the adjacent partitions 42 or 42a, the latter of which is split upon its center line 43 to form two partitions 42c. The partition parts 42 and 42a have trapezoidal ends 42b similar to those on the end walls and each partition 42c is severed from the blank except at the hinge points 44 allowing each partition 42c to be folded at right angles to the plane of the blank.

The partition 42 is completely severed from the blank with the exception of hinge portions 45 upon one side allowing the partition to be folded at right angles to the blank.

Adjacent each side of the blank, are cut triangular tongues 46 which are adapted for interlocking engagement with the slots formed by the tongues 40 in the end walls, as will later more fully appear.

The die cut blank just described constitutes an article of manufacture. A plurality of such blanks are adapted to be placed in a hopper 47 (Figs. 1 and 2) upon the machine and fed one at a time to the operating mechanism. The blank feeding mechanism comprises a hollow cross head 48 carrying a plurality of suction or vacuum cups 49 which are adapted to grip a blank and remove the same from the hopper where it is normally confined by lips 49a and 47b, the latter of which is adjustable upon the wall of the hopper. The cross head 48 is secured to a hollow and bent lever 50 which has a hub 50a on a hollow shaft 51 adapted to convey air and suitably supported upon the machine. A link 52 suitably connected to the tubular lever 50, is pivoted to a crank arm 53 fast on shaft 54. An arm 55 fast on shaft 54 is connected by a link 56 with a crank arm 57 which is integral with an air valve (not shown) for controlling air from or to the vacuum cups through tubular lever 50. A coil spring 58 anchored at one end to one of the channel frame members 59 is connected at its other end to crank arm 55 for normally holding the air valve in a predetermined position, and exerting a pull upon the arm 55 which tends to rotate shaft 54 in an anti-clockwise direction for swinging the loaded suction cups away from the hopper. A cam operated lever 60 is secured to shaft 54 and carries a roller 61 at its free end in the plane of a cam 62 on cam shaft 63. Rotation of cam shaft 63 will control the swinging movements of the tubular lever and its vacuum cups which are in communication with the air passage in such tubular lever.

The vacuum cups will deposit a blank 30 upon a pair of supporting rails 80 (Fig. 2) and then release the same. From this deposited position, the blank is adapted to be advanced to the first operating station B. To advance the blank, there is provided a generally vertical lever 64 pivoted upon a base foot 65 and connected by an adjustable link 66 to a lever 67 which is pivoted at its upper end upon a stub shaft 68. Lever 67 is provided with a cam engaging stud or roller 69 (Fig. 2) which enters a cam groove in cam drum 70 for positive advance and return of the feeder bar as will now appear.

Figures 4, 5:
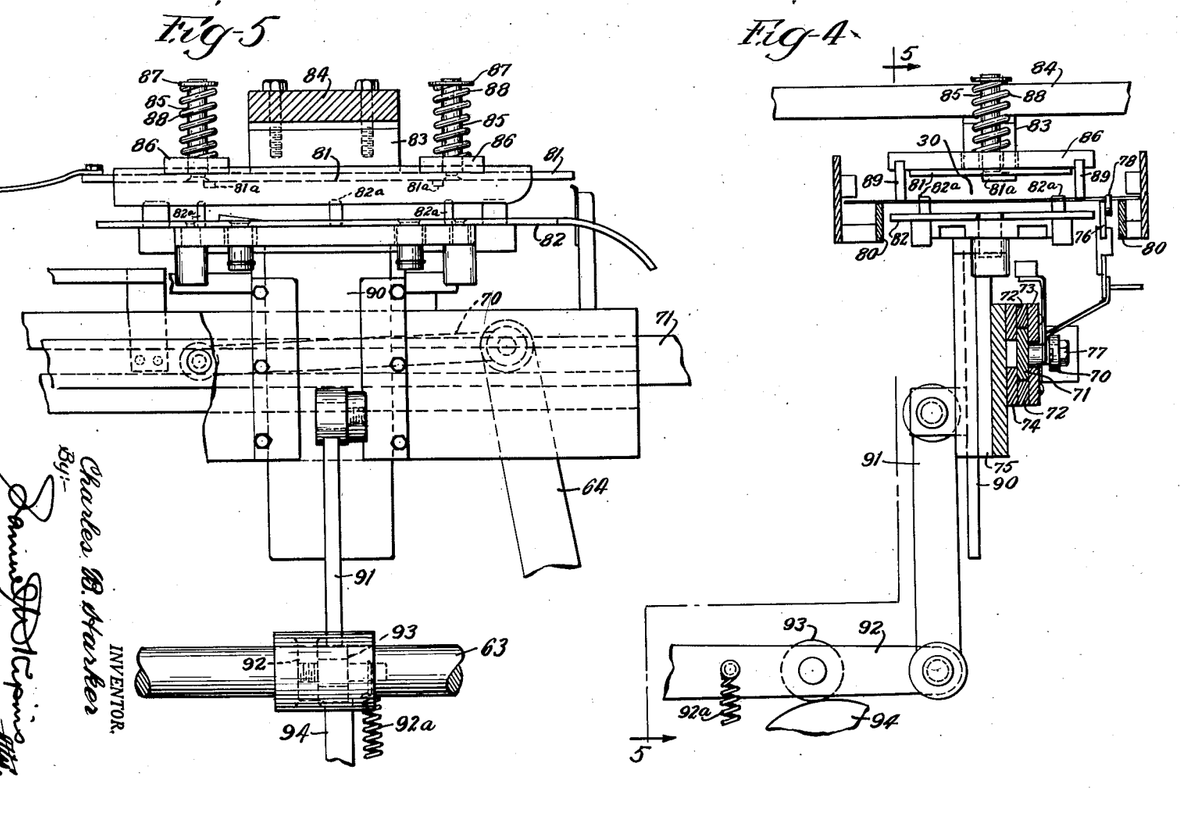
Fig. 4 is a sectional view taken upon the line 4—4 of Fig. 1 looking in the direction of the arrows and with parts omitted.
Fig. 5 is a sectional view taken upon the line 5—5 of Fig. 4 looking in the direction of the arrows.

The upper end of lever 64 is connected by a link 70 (Figs. 4 and 5) with a feeder bar 71 which is suitably supported for slidable movements in an open sided guideway formed by the strips 72, 73 and base members 74 and 75. An arm 76 extending from a stud 77 on the feeder bar has a blank engaging pawl or finger 78 adapted for engaging the edge of a blank and advance the same from directly below the hopper 47 to the first station B upon the rails 80.

At this station, there is an upper punch block 81 and a lower punch block 82. The upper punch block 81 is secured to a block 83 fastened on a cross member 84. A pair of studs 85 rise from the upper punch plate 81 and these studs extend through bars 86 and considerably thereabove where they are provided with heads 87 for confining coil springs 88 between such heads and the bars 86. These bars 86 have rails 89 fastened in the bottoms thereof against which the blank 30 can bear when it is subjected to the lower punch.

The lower punch 82 is carried by a vertically movable slide 90 to which a link 91 is pivoted. A lever 92 is pivotally connected to the lower end of link 91 and this lever 92 carries a roller 93 operated by a cam 94 on cam shaft 95. A spring 92a tends to draw the lever 92 downwardly against the cam.

Figure 15:
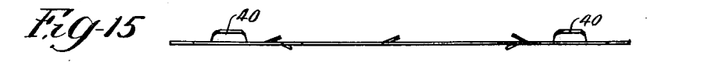
Fig. 15 is an edge view of the blank after the first operation of the machine.
Figure 16:
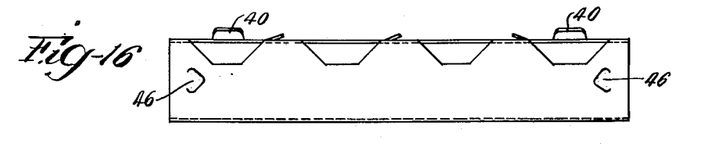
Fig. 16 is a side elevational view of a partially folded blank or box.
Figure 17:
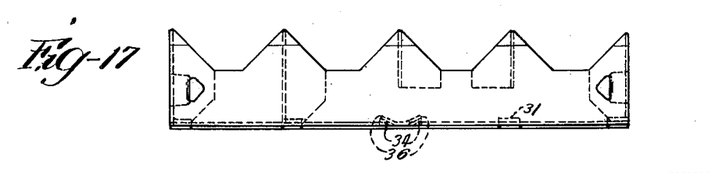
Fig. 17 is a side elevational view of a completed box.
Figure 18:
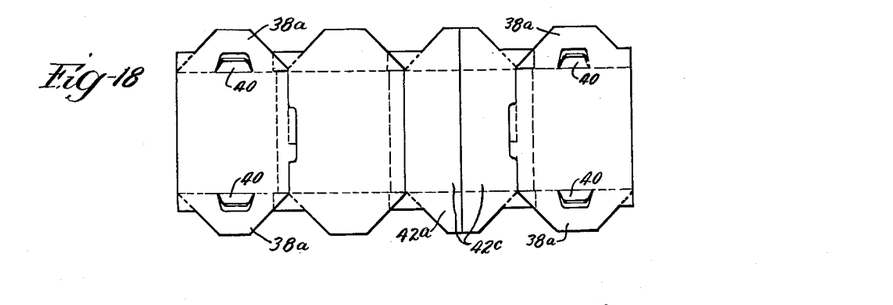
Fig. 18 is a top plan view of a partially folded box at the end of the second operation.

When the slide 90 is moved upwardly, the blank 30 will be properly punched by the punch pins 82a and a boss 81a secured to the bars or strips 86 and rails 89 will have been elevated above punch plate 81. Only certain punch pins on the plate 82 can be seen, but it will be understood that the required punch pins are carried by plate 82 to deflect the tabs or lugs indicated in Fig. 14 so that the operation will produce a blank as shown in Fig. 15. After the punching has been finished, the springs 88 will return the blank to the rails 80.

The punched blank is now ready for the second operation which is performed at station C and is best shown in Figs. 6, 7 and 23 to 27. The blank is adapted to be transferred from station B to station C by an arm and finger or pawl device 76, 78 attached to the feeder bar 71 and similar to that shown in Figs. 4 and 5. The feeder bar 71 extends lengthwise of the machine for this purpose.

Figure 6:
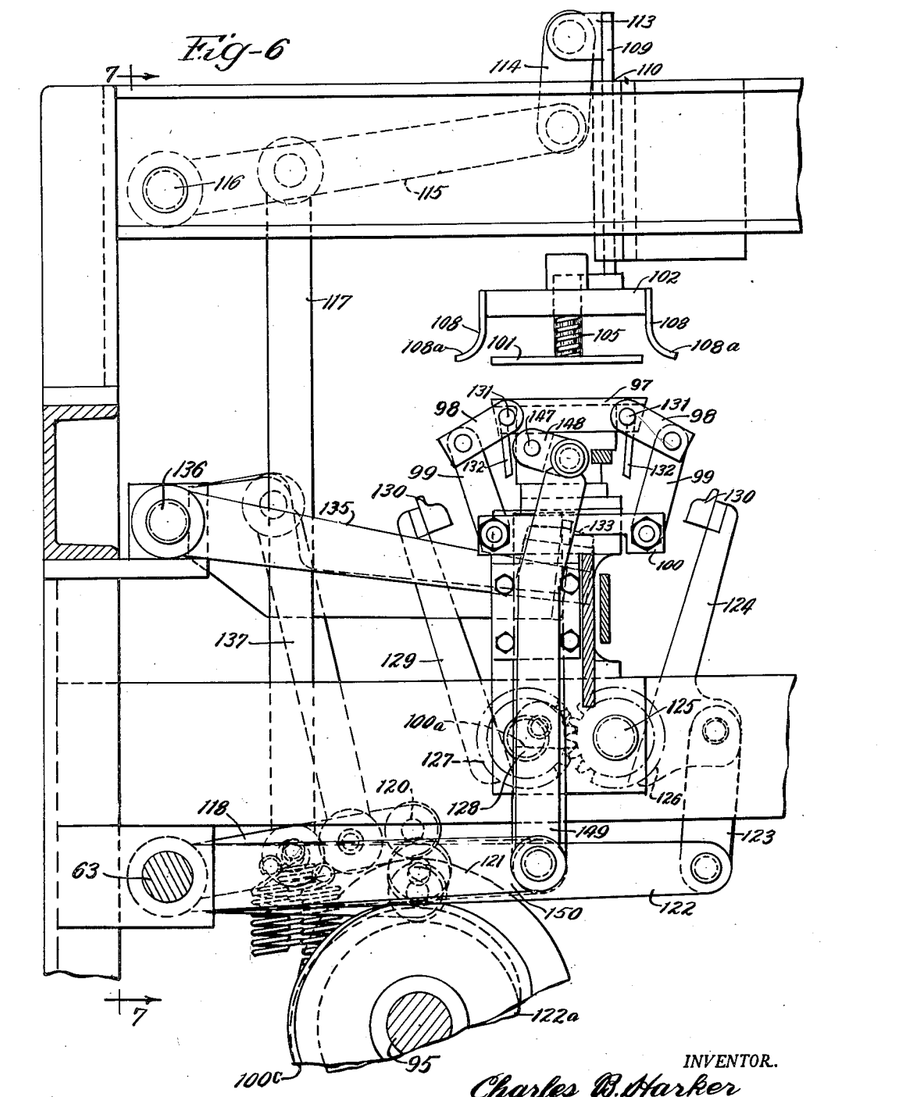
Fig. 6 is a sectional view taken upon the line 6—6 of Fig. 1 looking in the direction of the arrows.

The punched blank is transferred to a platform 97 shown in Figs. 6, 7 and 23 to 27. At this station C, five different operations are performed which are indicated in Figs. 23 to 27. The platform 97 is supported by several sets of toggle links 98 and 99 (Fig. 6). Each set of toggle links is pivotally connected at their lower ends to a cross head 100 which is suitably supported upon a slide 100a in a guideway 100b and they are rigidly connected at their upper ends upon rods 131.

A presser plate 101 is adapted to cooperate with the platform or platen 97. This presser plate 101 is yieldingly attached to a cross head 102. To this end, the presser plate has a plurality of upwardly directed studs 103 (Fig. 7) which slidably extend through the cross head and have anchor rings 104 at their upper ends to prevent the presser plate from falling off. To maintain the presser plate at its lower limit, coil springs 105 are interposed between the presser plate and hoods or caps 106 upon the upper side of the cross head. Guide studs 107 on the presser plate extend into the springs for guiding the same. Upon the sides of the cross head 102, there are box side folding plates 108 which extend beneath the cross head and which are provided with outwardly curved terminal portions 108a.

In order to raise and lower the cross head 102, there is provided a plate stem 109 which is attached to the cross head and extends through a suitable guideway 110 formed by plates 111 and 112 supported by a channel frame member 59. The upper end of the plate stem is provided with a lug 113 to which a link 114 is pivoted. The link 114 is pivotally connected to one end of an operated lever 115; the other end of the lever being pivoted to a stub shaft 116 extending from the back of the channel 59. An intermediate point of the lever 115 is pivotally connected to a rod 117 which is connected at its lower end to an arm 118 pivoted at one end upon shaft 63; the free end of arm 118 carrying a roller 120 engaging a cam 121 upon cam shaft 95.

Figure 23:
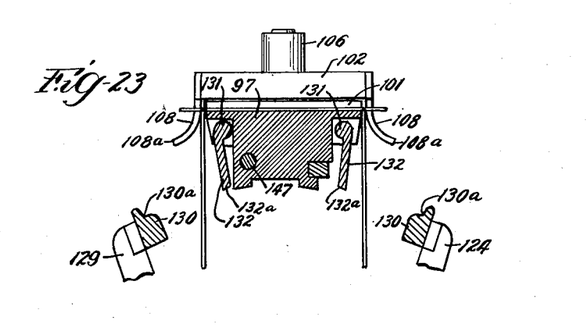
Figs. 23, 24, 25, 26 and 27 illustrate successive folding stages as performed in the machine.
Figure 24:
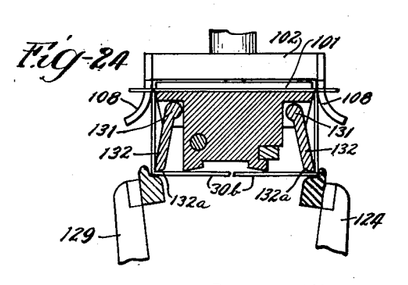

The operation of cam 121 will lower presser head 101 upon the blank upon the platform 97 as shown in Fig. 23, and cause the side folders 108 to bend or fold the blank 30 to form the side walls 30a, a portion of which will become the bottom 30b in the next operation (Fig. 24).

Figure 7:
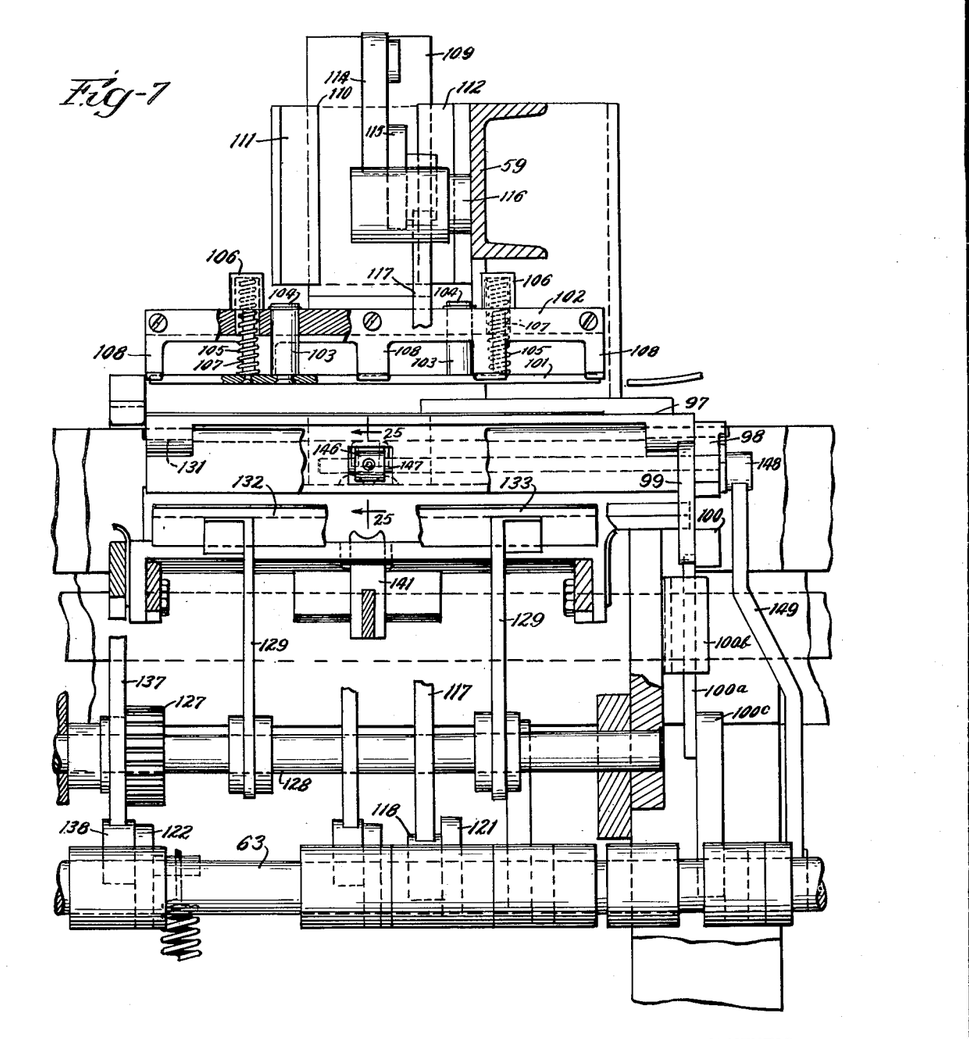
Fig. 7 is a sectional view taken substantially upon the line 7—7 of Fig. 6.

The next operation is brought about through lever 122 pivoted upon shaft 63 and connected by link 123 with upstanding folding arm 124 which has a hub secured to shaft 125. The shaft 125 may support one or more folding arms 124 as desired. The shaft 125 has fixed thereon a gear 126 which meshes with a gear 127 secured upon a shaft 128 (Fig. 7). A pair of folding arms 129 are secured upon shaft 128. As a result, the inward movement of arm 124 will rotate shafts 125 and 128 and cause the folding arms 124 and 129 to approach each other.

Figure 26:
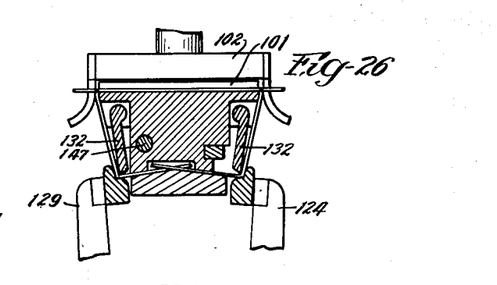

The lever 122 is operated by a cam 122a upon shaft 95; this cam should have two different swells, one for bringing the folding arms 124 and 129 together into the positions shown in Fig. 24, and the other for bringing the arms closer together into the positions shown in Fig. 26. The upper ends of the folding arms are provided with suitable plate pads 130, which extend substantially the length of the box.

Rigidly supported upon the rods 131 which carry the upper toggle links are box corner forming members 132 which are in the form of plates with downwardly sloping lower edges 132a. It is necessary to set these plates 132 before the second stage of the operation takes place. This is accomplished by a cam 100c on shaft 95, operating the slide 100a which is connected to cross head 100 and which elevates the cross head 100 and causes a further depression of the toggle links with a rotation of rods 131 in such directions as to swing the corner forming plates outwardly into the positions shown in Fig. 24.

With the corner forming plates properly set as shown in Fig. 24, the inward swinging movements of the side forming plate pads 130 will bend the box sides at substantially right angles with the inturned portions 30b forming the bottom of the box. It will be noted that the upper portion of the plate pads have rabbets 130a which form corners upon the box, into which the the bevelled ends of the plates 132 extend.

Figure 1:
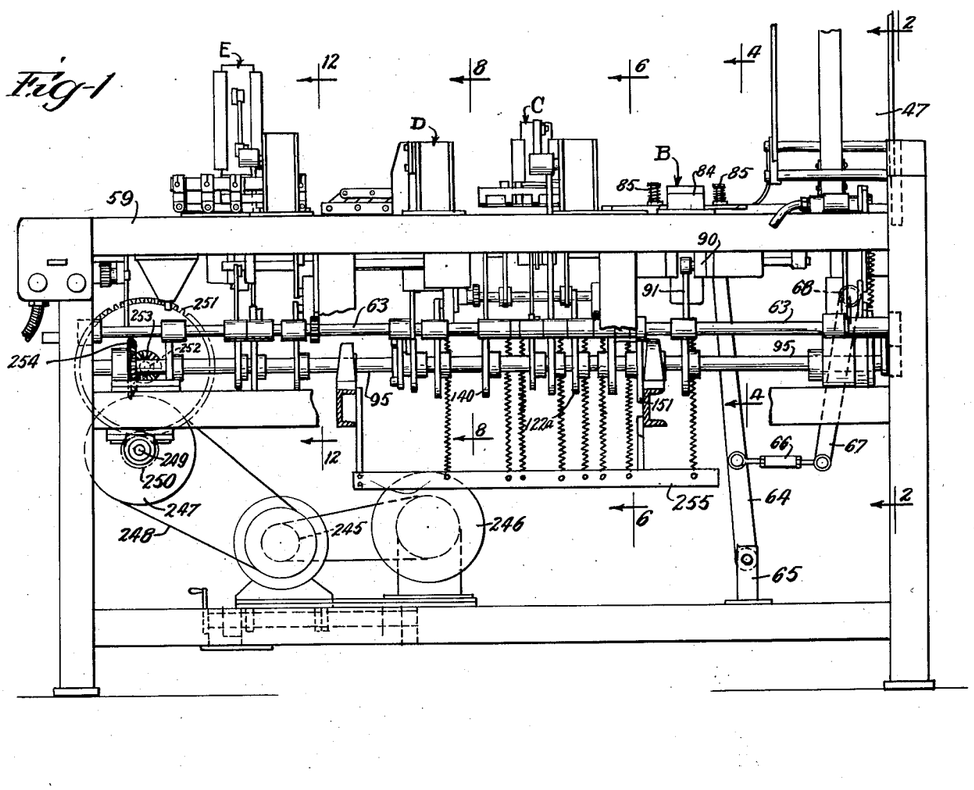
Fig. 1 is a side elevational view of a fibrous box making machine involving this invention.
Figure 2:
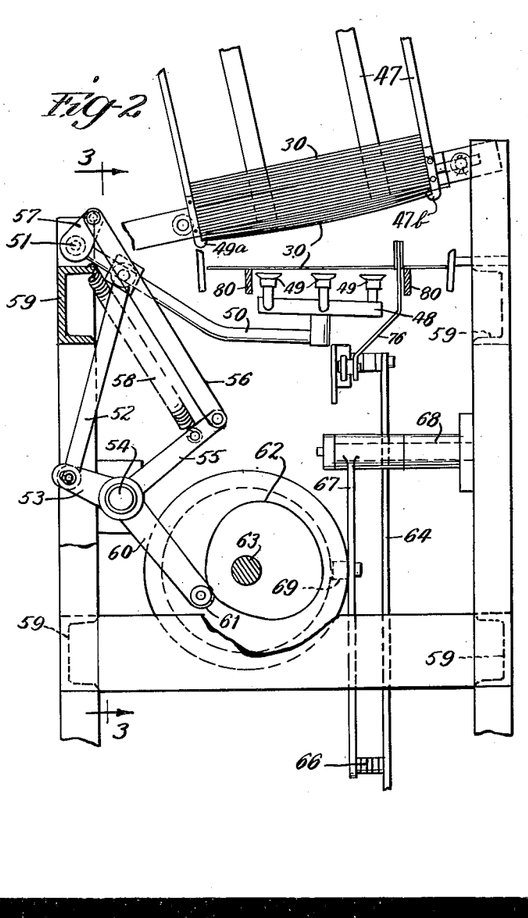
Fig. 2 is a sectional view taken substantially upon the line 2—2 of Fig. 1, looking in the direction of the arrows.
Figure 3:
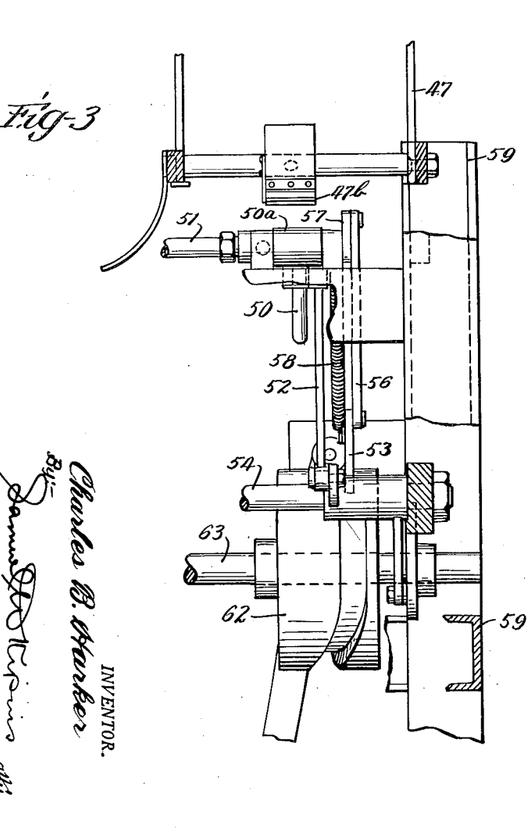
Fig. 3 is a sectional view taken upon the line 3—3 of Fig. 2 looking in the direction of the arrows.
Figures 25, 27, 28:
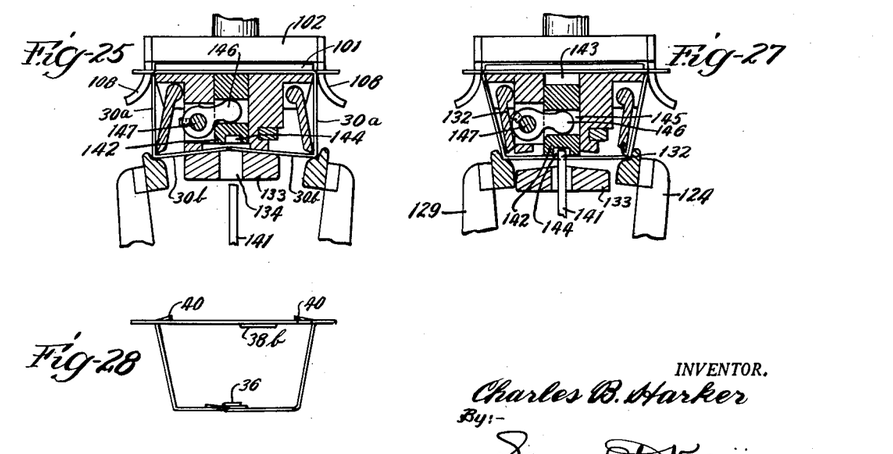
Fig. 28 is an end elevational view of a box partially formed in the operations shown in Figs. 23 to 27 or Fig. 16.

The next operation or third stage is illustrated in Fig. 25, which discloses a section through the platform substantially upon the line 25—25 of Fig. 7. In referring to Fig. 25, it will be noted that an anvil 133 with an aperture 134 and an upper surface having a slight convexity is carried by a lever 135 (Fig. 6) pivoted upon a shaft 136 carried by the frame. A link 137 is pivoted at its upper end to said lever 135 and at its lower end to an arm 138 pivoted upon shaft 63, which arm 138 is actuated by cam 140 on shaft 95 (Fig. 1). Thus cam 140 is instrumental in elevating anvil 133 into the position shown in Fig. 25 forming a support for the blank at the tucker spot.

Following the raising of the anvil, the lateral wing plates 130 are brought closer together as shown in Fig. 26, an operation which brings the free edges of the blank 30 into overlapping relation for fastening by the tuckers 34 and 36 shown in Fig. 14. For this purpose, there is provided a tucker punch 141 having an upper concave end which is designed to be projected through the aperture 134 in the anvil and interlock the tucks on the blank. To firmly hold the blank during the tucking operation, there is provided a second anvil 142 in a guideway 143 in the platform in registry with the tucking punch to receive which punch it has a recess 144 in its bottom. This second anvil has a central passage 145 into which a crank arm 146 extends for pressing the second anvil downwardly during the tucking operation. The crank arm 146 is secured to a rod 147 extending lengthwise through the platform and having an arm 148 (Fig. 7) connected thereto which arm 148 is connected to a link 149 (Fig. 7). The link 149 is connected to an arm 150 pivoted upon shaft 63, which arm 150 is operated by cam 151 (Fig. 1).

The next operation on the box is performed at station D by the mechanism shown in Figs. 8 to 11, which tucks in the end walls of the box and brings the end walls and partitions to substantially vertical positions. The box is adapted to be moved from station C to station D by the feeder bar 71 and a finger thereon.

Figure 8:
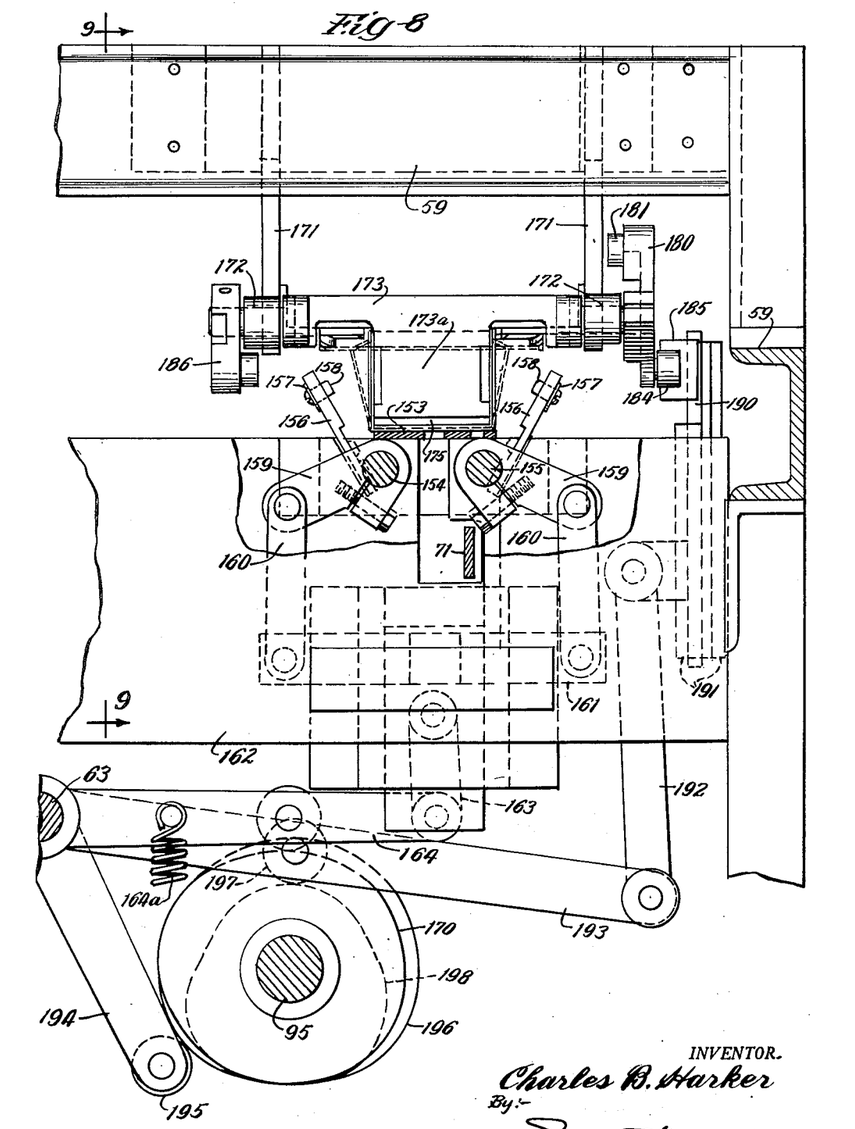
Fig. 8 is a sectional view taken substantially upon the line 8—8 of Fig. 1 looking in the direction of the arrows.
Figure 19:
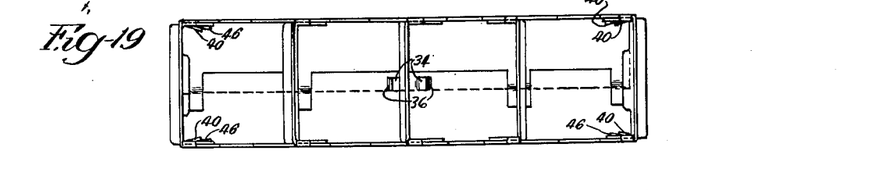
Fig. 19 is a top plan view of a partially folded box at the end of the third operation.

A suitable platform 153 is provided at station D upon which the box is positioned. At this station, there are a pair of parallel shafts 154 and 155 to which plates 156 are attached. These plates 156 have narrow strips 157 of suitable metal upon their rear faces and these strips 157 have right angled tuckers 158 at their ends which extend through the plates 156 which have provision therefor. There are two tuckers upon each side and these tuckers 158 are adapted to engage the tucks 46 upon the sides of the box and tuck the same under the flaps 40 upon the end walls as shown in Fig. 19. Means are provided for simultaneously rocking shafts 154 and 155 as shown in Fig. 8, to tuck in the end walls. To this end, a crank arm 159 is secured to each shaft and each crank arm is pivotally connected by a link 160 to a slidable cross head 161 upon a suitable support 162 on the framework. The slide 161 is connected by a link 163 with a cam operated lever 164 pivoted upon shaft 63 and operated by a cam 170 upon cam shaft 95. Upward movement of the slide 161 will swing the tucker plates 156 toward each other and secure the end walls of the box to the side walls by the aforementioned tucking operation.

Figure 10:
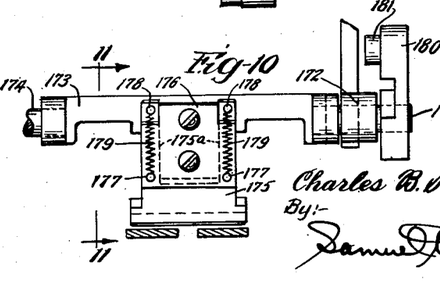
Fig. 10 is a sectional view taken upon the line 10—10 of Fig. 9 looking in the direction of the arrows.
Figure 11:
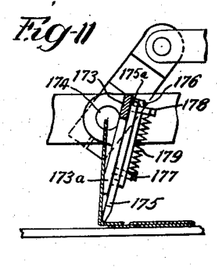
Fig. 11 is a sectional view taken upon the line 11—11 of Fig. 10 looking in the direction of the arrows.

Supports 171 extend down from the frame channel 59 for supporting the partition and end walls turing mechanism. Longitudinally extending frame members 172 are welded or secured to these supports in suitable spaced relation. Transverse bars 173 with end journals 174 are mounted between the bars 172 with the journals in said bars 173. These bars 173 are suitably spaced in accordance with the partitions and end walls of the box. To the medial portion of the bars 173, there are slidably mounted plates 175. These plates are bifurcated to provide upwardly extending spaced arms 175a (Fig. 10).

A cover plate 176 extends over each slidable plate 175 and is screwed to the transverse member which has a downwardly extending extension 173a for this purpose. Studs 177 are secured to each cover plate near their lower ends and studs 178 extend from the upper ends of the arms 175a on the slide plates 175. Coil springs 179 connect the studs 177 and 178 and normally tend to draw the slide plates 175 downwardly.

The present machine is designed to make a box having four compartments having two end walls and three partitions. As a result, five truing plates 175 are required. The arrangement is such that one end wall and the two next partitions must be rectified by movement in one direction while the other end wall and the adjacent partition must be rectified by movement in the other direction. Mechanism has been provided for simultaneously operating the two sets of rectifying members in opposite direction; that is three will move in one direction while the other two will move in the other direction.

Figure 9:
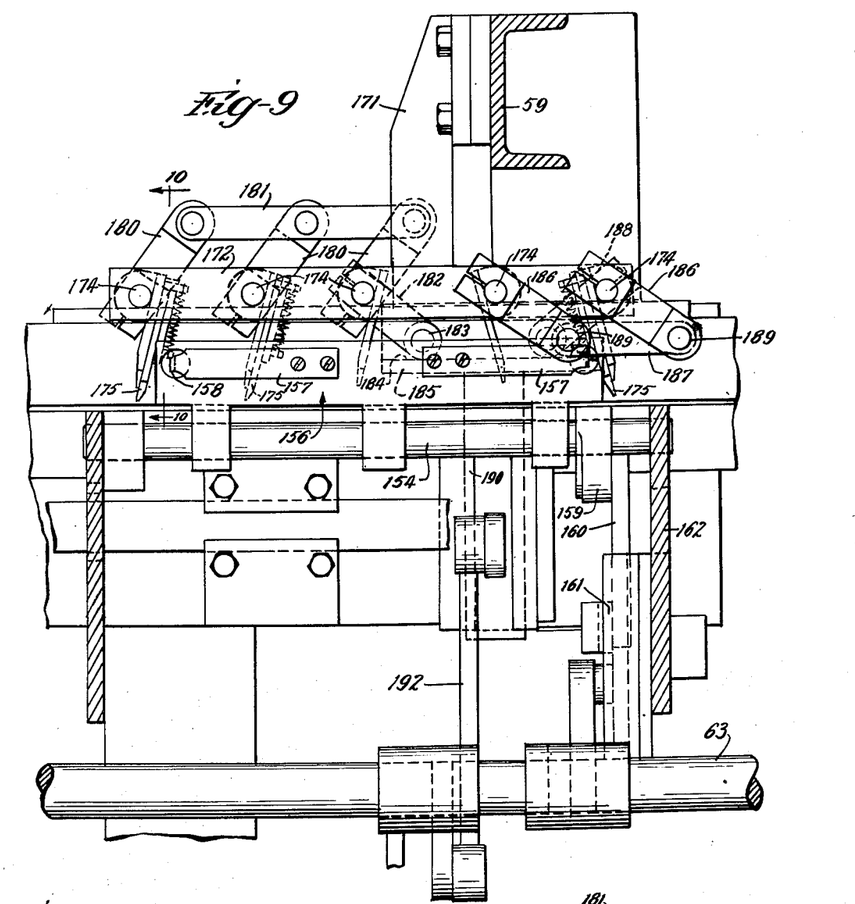
Fig. 9 is a sectional view taken upon the line 9—9 of Fig. 8 looking in the direction of the arrows.

Referring to Fig. 9, it will be noted that the three rectifying members upon the left hand side of the figure have crank arms 180 secured to the journals thereof and that these three arms 180 are connected together by link 181. As a result, movement of either arm will simultaneously move the others. To operate these three at the same time, an arm 182 (Fig. 9) is secured to the rearmost of the three transverse bars 173 and this arm has a roller 183 that extends into a groove 184 in a movable cross head 185.

The two right hand rectifiers have downwardly extending arms 186 which are pivotally connected at their free ends by a link 187. The rearmost rectifier has an arm 188 extending downwardly from its journal 174 and this arm carries a roller 189 which also extends into the groove 184 of the movable cross head 185. As a result, movement of the arm 188 will simultaneously operate the rectifiers 175 thereon.

The movable cross head 185 is rigidly connected to a slide 190 which is guided in a suitable guide way formed by plates 191. A link 192 is pivotally connected to the slide 190 and this link is connected at its free end to a cam lever 193 having a hub journalled upon shaft 63 which hub has an arm 194 with a roller 195 engaging cam 196. Lever 193 has a roller 197 engaging cam 198. Cam 198 will elevate lever 193 and raise the slide 185 while cam 196 will lower lever 193 producing a positive action in both directions. Lever 164 which operates slide 161 is however returned by a coil spring 164a.

In Fig. 9, the rectifiers are shown in operative positions in which the partitions and end walls have been swung to vertical positions with the ends of the members 175 forming true corners. Elevation of the slide 190 will swing the rectifiers to inoperative positions and above the platform.

Figure 20:
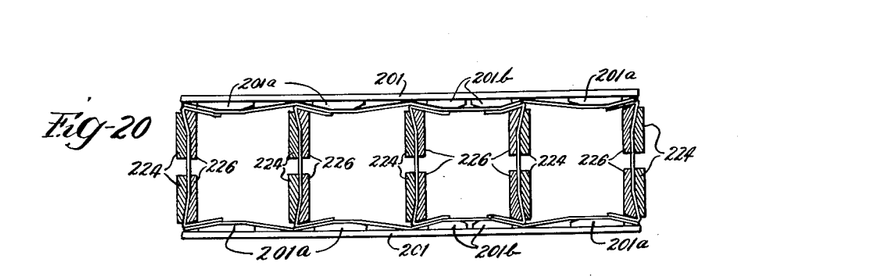
Fig. 20 is a top plan view illustrating the fourth or creasing operation.
Figure 21:
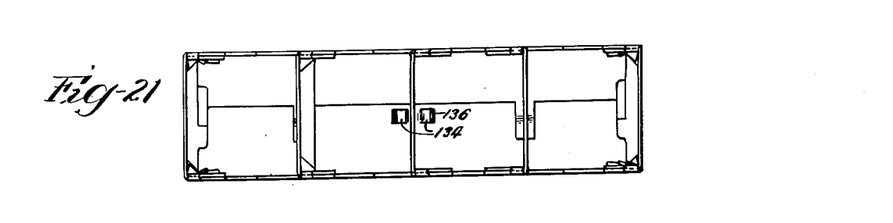
Fig. 21 is a top plan view of a completed box.
Figure 22:
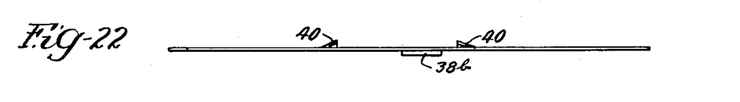
Fig. 22 is an edge view of a partially formed blank ready for the folding operation.

The box will emerge from the operations at station D in the form shown in Fig. 19. From station D, the box will be transferred by the feeder bar 71 to station E shown in Figs. 12 and 13 where it will be given its final form as shown in Figs. 20 and 21. The box will be placed upon the platform 200 between the presser plates 201 which are attached to shafts 202. Crank arms 203 are secured to the shafts 202 and these crank arms 203 are connected by links 204 to a crosshead 205 which is integral with a slide 206 connected by a link 206a to a cam lever 207 journalled on shaft 63 and which is operated by a cam 208 upon cam shaft 95 through the roller 209 upon said lever.

The wing plates 201 carry upon their inner surface blocks 201a and 201b (Fig. 20), the inner faces of which are bevelled for engaging the sides of the box and pressing the same inwardly between the partitions.

Above the wing plates, there is a cross head 210 rigidly connected to a slide 211 which reciprocates in a guideway 212 formed by suitable plates upon a support 213 rising above one of the channel frame members 59. The slide 211 carries a bearing block 214 to which a link 215 is pivotally connected at one end; the other end of the link 215 is pivotally connected to a lever 216 which is pivoted to the frame member 59 as indicated at 217. An intermediate point of the lever 216 is pivotally connected to a long link 218 which is pivotally connected to a lever 219 journalled upon shaft 63. The lever 219 is provided with a roller 220 for engagement by a cam 221 upon cam shaft 95. Through this mechanism, the cross head 210 can be raised and lowered. The lever 219 may be returned from elevated position through the usual coil spring which has been shown in connection with the other cam levers.

Figure 12:
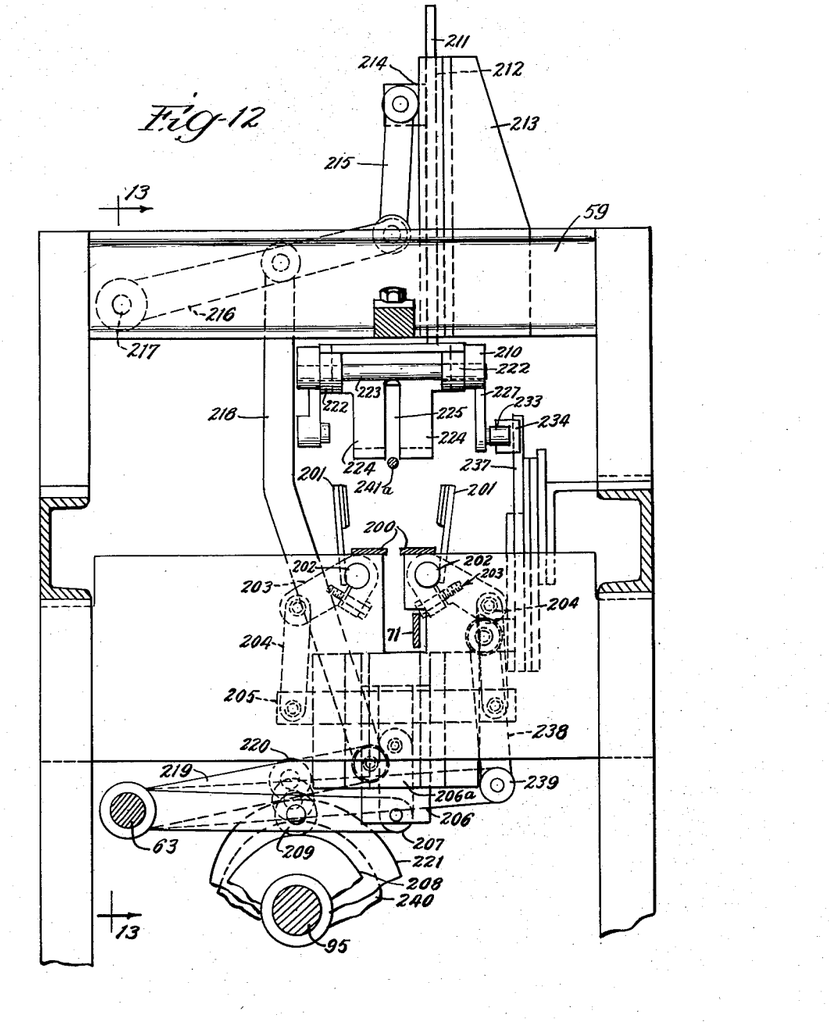
Fig. 12 is a sectional view taken upon the line 12—12 of Fig. 1 looking in the direction of the arrows.
Figure 13:
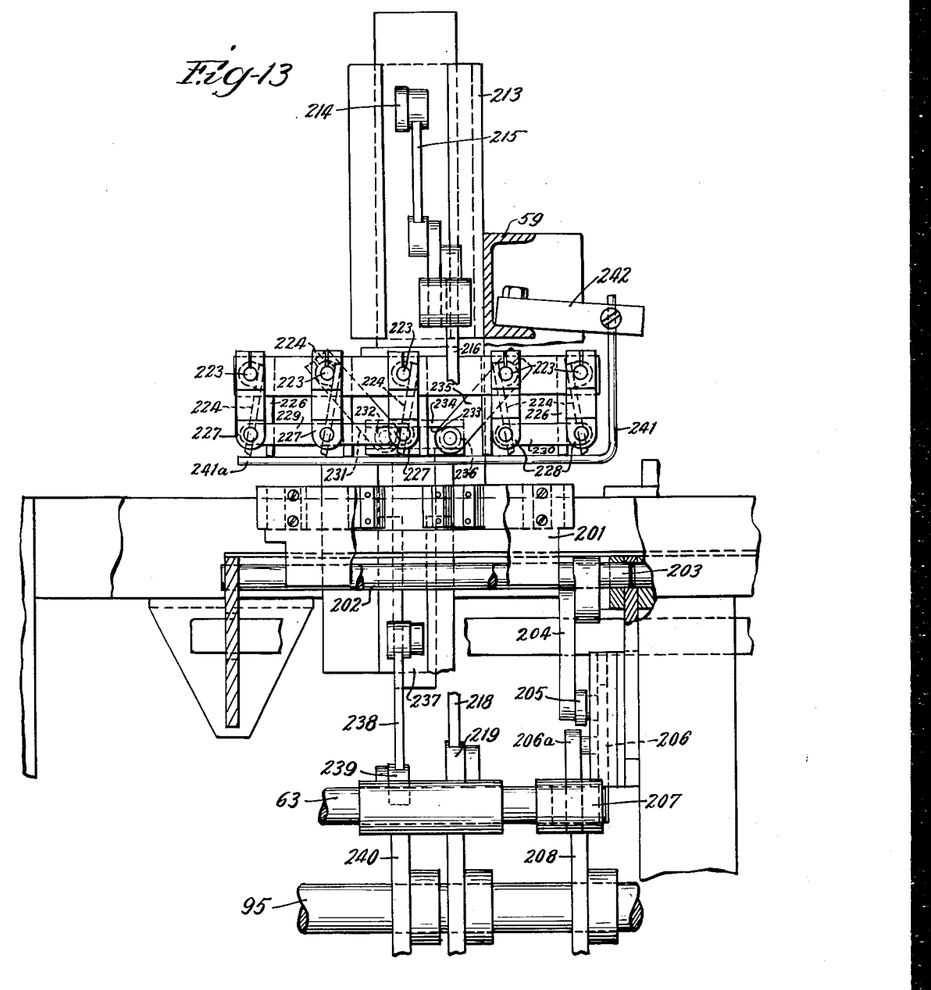
Fig. 13 is a sectional view taken upon the line 13—13 of Fig. 12 looking in the direction of the arrows.

The cross head 210 consists of a pair of side members 222 which support rods or shafts 223 for rotation. Each rod 223 carries a pair of plates 224 which are located in the same plane but with their adjacent edges spaced apart as indicated at 225 (Fig. 12). Spaced plates 226 are secured to the members 222 (Figs. 13 and 20). A set of plates 224 and the adjacent set of plates 226 are adapted for receiving a partition or end wall therebetween as shown in Fig. 20.

Arms 227 extend down from the three shafts 223 upon the left hand side while arms 228 extend down from the two shafts to the right of Fig. 13. A link 229 connects with the arms 227 while a link 230 connects the arms 228. Hence the three arms 227 must swing together and the two arms 228 must swing together. Rotation of these arms will rotate the shafts 223 which carry the movable plates 224. An arm 231 rigidly secured to the second shaft 223 from the left in Fig. 13 extends downwardly at an angle and carries a roller 232 which extends into a groove 233 in a cross head 234. A similar arm 235 extends down from the second shaft 223 from the right and this arm carries a roller 236 which also extends into the groove 233 in the cross head 234. The cross head 234 has a slide tongue 237 to which a link 238 is pivotally connected. The link 238 is pivoted to a cam lever 239 mounted upon shaft 63 and operated by cam 240 on cam shaft 95. Elevation of the slide and cross head 234 will cause the movable plates 224 to move against the stationary plates 226 and press the partitions and walls of the box into final form.

A box stripper 241 in the form of an L-shaped rod is supported by an arm 242 from a channel member 59. One arm 241a of the stripper extends under the cross head 210 in the plane of the space or slot 225. When the cross head is lowered the stripper arm 141a will enter the slot 225 so as to always be above the box. When the box has been completed and the cross head 210 is elevated, the arm 141a will strip the box from the cross head.

The driving mechanism for the machine is shown in Fig. 1 and consists of a motor 245 having a belt drive to a vacuum pump 246 for creating the vacuum for the vacuum cups. The motor 245 is also connected to a sprocket gear 247 through sprocket chain 248. The sprocket gear 247 drives a shaft 249 having a gear 250 thereon which meshes with a gear 251 on a shaft 252 which carries a bevel gear 253 which drives a bevel gear 254 on the cam shaft 95.

It will further be noted in Fig. 1, that a spring anchoring bar 255 has been provided to which the cam levers return springs are anchored. As the use of such lever return springs are old and well known, they have not been fully illustrated or disclosed. It will be understood they are used where necessary.

It is characteristic of this invention that the boxes are formed without any metal fasteners, yet they are strong and durable without any collapsing tendency. It is further characteristic of this invention that the boxes are continuously and automatically formed from a die cut blank; and that a continuous stream of blanks can be passed through the machine without an appreciable time interval between the same, and in which the edges and corners are well formed and defined which tends to strengthen the box structure.

I am aware that many changes may be made and various details of construction may be modified without departing from the principles of this invention so I do not propose limiting the patent granted otherwise than necessitated by the appended claims.

I claim:

1. In a machine for forming fibrous boxes from a die cut blank, means for deflecting the die cut portions, means for folding said blank to provide parallel wall portions, means for folding said wall portions at intermediate lines in the same plane toward each other to provide bottom portions, means for compressing the wall portions to cause the adjacent edges of the bottom portions to overlap, said overlapping portions having die cut tucks, means for engaging said tucks to tie the bottom portions together, said blank being die cut to provide end walls and partitions, means for tucking the end walls to the side walls, means for rectifying the end walls and partitions, and means for forming sharp angles at the folded crease lines.

2. In a machine for forming fibrous boxes from a blank die cut to provide end walls and intermediate partitions with tucks for securing the end walls and tucks for the bottom portions, punching mechanism for the die cut portions, means for folding the blank to provide parallel side walls, means to fold said side walls upon intermediate lines in the same plane toward each other to provide bottom portions, means to press the side walls toward each other to cause the bottom portions to overlap, said overlapping portions having securing tucks, means for interlocking said tucks, means for tucking the end walls to the side walls, means for rectifying the end walls and partitions to vertical positions with sharply defined angles and means engaging opposite sides of said end walls and said partitions for truing the same.

3. In a machine for forming fibrous boxes from a blank die cut to provide end walls and intermediate partitions, means for deflecting certain die cut portions, a platform for receiving the blank, a presser head having side wings cooperating with said platform for folding parallel side walls upon said blank, cooperating members for folding said side walls upon intermediate lines toward each other to form bottom portions, means for pressing the side walls toward each other to cause the said bottom portions to overlap, means for interlocking the overlapping bottom portions, means for interlocking the end walls with the side walls, movable plates for rectifying said end walls and partitions, and means for moving certain of said plates in one direction and the other plates in the other direction for truing said end walls and said partitions.

4. In a machine for forming fibrous boxes from a blank die cut to provide end walls and intermediate partitions and tieing tucks for the end walls, a platform for receiving said blank, a presser head having curved wings cooperating with said platform for folding said blank to provide parallel side wall portions, struts movable to intermediate points of the interior surface of said side walls, swingable members having right angled corners for engaging said side walls upon the exterior thereof and folding the same toward each other over said struts to provide bottom portions, means for further actuating said swingable members for causing said bottom portions to overlap, means for interlocking said overlapping bottom portions, means for interlocking the end walls to the side walls through said tucks, and sets of oppositely movable end walls and partition rectifying members adapted for positioning in the box and means for actuating said members for rectifying the end walls and said partitions, and means for simultaneously clamping each end wall and partition for the purpose set forth.

5. In a machine for forming fibrous boxes from a blank die cut to provide end walls and intermediate partitions, means to fold said blank to provide side walls terminating in overlapping bottom portions, means for interlocking said overlapping bottom portions, means for interlocking the end walls with the side walls, means adapted for positioning within the box for rectifying said partitions and said end walls and clamping members for simultaneously engaging said end walls and said partitions independently of each other for finally truing the same.

6. In a machine for forming fibrous boxes from a blank die cut to provide end walls and intermediate partitions with tucks for engaging the end walls with the side walls, a hopper for containing a stack of blanks, means including vacuum cups for extracting the blanks from the hopper, supports for receiving the blanks, a feed rod having means for advancing said blanks, a first station for receiving said blanks, means for deflecting the die cut portions of said blank at the first station, a second station having a platform, means for advancing said blank upon said platform, means for holding side walls and bottom portions upon said blank upon said platform, means for pressing the side walls toward each other to cause said bottom portions to overlap, means for interlocking said overlapping portions, a third station, means for advancing the partly formed box to said third station, means at said third station for interlocking the end walls with the side walls and means for rectifying the end walls and partitions.

7. In a fibrous box making machine for forming a box from a die cut blank comprising a hopper for containing blanks, means for delivering a blank from the hopper to supporting rails, means for advancing the blank to a punching station, a punching device at said station for deflecting flaps and tucks from said blank, means for then advancing said blank to a folding platform, a presser head having folding wings for engaging said blank and folding the same to provide parallel wall portion at right angles to said platform, means for bending said wall portions to form bottom portions extending toward each other at right angles to the wall portions comprising a pair of cooperating plate members, means for operating said cooperating plates for causing one bottom portion to overlap the other bottom portion, means for tucking said bottom portions together, another station, means for advancing the partially formed box to said further station, means for tucking the end walls to the side walls at said further station and means for rectifying partition walls and end walls at said station.

8. In a machine for forming fibrous boxes from a blank die cut to form end walls, intermediate partition and bottom portions, with side and bottom tucks, means to punch the die cut portions partially from the plane of the blank, means to fold the blank to provide spaced parallel side walls, co-acting members to fold said side walls at intermediate lines toward each other to form bottom portions, means for overlapping said bottom portions and interlocking the same, means for interlocking the end walls with the side walls, and truing mechanism for righting the end walls and partitions.

9. In a machine for forming fibrous boxes from blanks cut to form end walls and intermediate partitions, means for folding said blank to provide side walls and bottom portions, means to overlap said bottom portions, means to unite said bottom overlapping portions, means for interlocking the end walls with the side walls, a vertically movable cross head, swingable plates carried by said cross head for insertion in the partially formed box, and means for simultaneously moving said plates for engagement with said partitions and said end walls for righting the same and producing sharp angles at the juncture of the same with the bottom of the box.

10. In a machine for forming fibrous boxes from a blank die cut to provide end walls and intermediate partitions with side flaps, means to fold said blank to provide parallel side walls, co-acting means to fold said walls at intermediate lines in the same plane toward each other to form bottom portions, means to press the side walls toward each other to cause said bottom portions to overlap, means to interlock the overlapping bottom portions, means to interlock the side wings of the end walls with the side walls, a vertically movable cross head, plates carried by said cross head, means for actuating said plates against said end walls and said partitions to right the same in vertical planes and means for compressing each end wall and each partition to firmly set the same with respect to the body portion of the box.

11. In a machine for forming fibrous boxes from a blank die cut to provide end walls and intermediate partitions and interlocking tucks, means to deflect the die cut portions partially from the plane of the blank, a platform, means for conveying the blank upon said platform, a presser head having side wings cooperating with platform for folding said blank to form parallel side walls, co-acting means for folding said side walls toward each other upon intermediate lines to provide bottom portions, means for operating a part of said co-acting means against said side walls for overlapping said bottom portions, said bottom portions having interlockable tucks, means for interlocking said tucks, and advanced station, means for transferring said partially formed box to said advanced station, means at said station for interlocking the end walls with the side walls and vertically movable means at said station for righting said end walls and said partitions and truing the same.

12. In a machine for forming fibrous boxes from a die cut blank having partially severed tabs, means for punching the tabs in offset relation to the plane of the blank, a platform, means for moving said blank upon said platform to overlap the same, a presser having side wings for folding the overlapping portions of the blank at right angles to the platform, a pair of corner forming struts carried by said platform, means for positioning said struts against intermediate portions of the folded portion of the blank, a pair of co-operating folding arms having angular seats for folding the portions of the blank beyond the struts at right angles over said struts to form the bottom of the box, means for operating said folding arms for overlapping the bottom portions of the box, means for uniting the overlapping portions of the bottom and means for folding the ends of the box and uniting the same with the sides thereof.

13. In a machine for forming fibrous boxes with partitions from die cut blanks having partially severed end walls and partially severed intermediate partitions, means for folding said blank to provide parallel side portions, means for folding portions of said parallel portions to provide right angled bottom portions, means for overlapping and uniting said bottom portions, a platform, means for transferring the partially formed box upon said platform, a plurality of end and partition rectifying and truing plates mounted above said platform adapted for elevating and lowering movements, means for moving certain of said plates in one direction and the others in the opposite direction for truing said end walls and partitions and means for uniting said end walls with said side walls.

14. In a machine for forming fibrous boxes from die cut blanks having tabs, partially severed end walls and partially severed partitions, a first station, means for placing a blank at the first station, punching means at the first station for deflecting the tabs, a second station, a platform at the second station, means for moving said blank upon said platform with the side portions of said blank extending beyond the platform, a folding member coacting with said platform for bending the extending portions of said blank into parallel wall portions, coacting means for folding the lower portions of said parallel wall portions toward each other at right angles for forming the bottom portion of the box, said coacting means also serving to cause the bottom portions of the box to overlap, means for uniting the overlapping bottom portions, a third station, a platform at the third station, means for advancing the box upon said last mentioned platform, a plurality of partition rectifying members and end wall rectifying members mounted at the third station for elevating and lowering movements into said box, means for actuating said members for rectifying said partitions and end walls, means at said third station for uniting the end walls with the side walls, a fourth station and means at the fourth station for truing the partitions and end walls.

15. In a machine for forming fibrous boxes from a die cut blank with tabs, means for deflecting said tabs from the plane of the blank, coacting means for folding said blank to provide parallel walls, coacting means for folding said parallel walls at an intermediate point toward each other at right angles into overlapping relation to form the bottom of the box, means for uniting the overlapped bottom portions, means for rectifying the end walls and means for uniting the end walls with the side walls through said tabs.

16. In a machine for forming fibrous boxes from a die cut blank having partially severed end walls and partially severed partitions and wall uniting means, means for folding said blank to provide side walls terminating in overlapping bottom portions secured together, longitudinally extending bars, end wall rectifying members pivotally supported upon said bars, intermediate partition rectifying members pivotally mounted upon said bars, means for actuating said rectifying members in proper directions for rectifying the end walls and said partitions, means for elevating and lowering said rectifying members, means for engaging said uniting means for securing the ends walls to the side walls, and means for truing the walls and partitions of the box.

17. In a machine for forming fibrous boxes from die cut blanks having partially severed end walls and partially severed partitions, means for forming said blank to provide end walls and, side walls terminating in a bottom and upwardly directed spacing partitions forming separate compartments, truing mechanism for said box comprising a pair of oppositely movable plates for truing the end walls, a plurality of plates movable for truing the partitions, means for supporting said plates above said box, means for actuating said plates and means for elevating and lowering said supporting means.

18. In a machine for forming fibrous boxes from a die cut blank having partially severed end walls and partially severed partitions, end wall uniting means, coacting means for folding said blank to provide parallel walls, coacting means to fold said parallel walls at an intermediate point toward each other at right angles to provide a bottom for the box, said last mentioned coacting means being operable for causing the bottom portions to overlap, means for uniting the overlapped portions of the bottom, a pair of tucking members upon each side of the box for uniting the end walls with the side walls, and means for rectifying said partitions and truing the same for forming separate compartments.

19. In a machine for forming fibrous boxes from die cut blanks having partially severed end wall portions with wall uniting means, coacting means for folding said blank to provide parallel walls, coacting members to fold said parallel walls at intermediate points toward each other to provide bottom portions, said coacting members being further actuable to cause said bottom portions to overlap, means for uniting the overlapped portions of the bottom portions, means for securing the end walls to the side walls, and a plurality of wall rectifying plates and means for supporting and actuating said plates.

CHARLES B. HARKER.

References Cited in the file of this patent

UNITED STATES PATENTS

| Number | Name | Date |
|---|---|---|
| 1,426,429 | Weightman et al. | Aug. 22, 1922 |
| 1,814,043 | Joslin | July 14, 1931 |
| 1,899,652 | Stortz | Feb. 28, 1933 |
| 2,017,583 | Burrow | Oct. 15, 1935 |
| 2,149,400 | Mazer | Mar. 7, 1939 |
| 2,458,341 | Cake | Jan. 4, 1949 |
| 2,524,133 | Pagendarm | Oct. 3, 1950 |
| 2,553,733 | Acker | May 22, 1951 |